United States Patent [19]

Hovan et al.

[11] 4,453,888

[45] Jun. 12, 1984

[54] NOZZLE FOR A COOLABLE ROTOR BLADE

[75] Inventors: Edward J. Hovan; Richard R. Neumayer, both of Manchester, Conn.

[73] Assignee: United Technologies Corporation, Hartford, Conn.

[21] Appl. No.: 249,767

[22] Filed: Apr. 1, 1981

[51] Int. Cl.³ ............................ F01D 5/18; F01D 25/18
[52] U.S. Cl. .......................... 416/97 R; 415/DIG. 1; 415/175
[58] Field of Search .............. 416/95, 96 R, 97 R, 416/96 A; 239/596, 598; 415/DIG. 1, 175

[56] References Cited

U.S. PATENT DOCUMENTS

| | | |
|---|---|---|
| 2,858,101 | 10/1958 | Alford . |
| 2,945,671 | 7/1960 | Petrie .................................. 414/115 |
| 3,043,561 | 7/1962 | Scheper, Jr. ........................ 415/115 |
| 3,501,249 | 3/1970 | Scalzo et al. ........................ 416/95 |
| 3,572,966 | 3/1971 | Borden et al. ....................... 416/95 |
| 3,635,586 | 1/1972 | Kent et al. ........................... 416/97 |
| 3,658,439 | 4/1972 | Kydd ................................... 416/97 |
| 3,706,508 | 12/1972 | Mozkowitz et al. ............... 416/96 A |
| 3,736,011 | 5/1973 | Kydd ................................... 416/97 |
| 3,816,022 | 6/1974 | Day ..................................... 416/97 |
| 3,856,430 | 12/1974 | Langham ....................... 415/DIG. 1 |
| 4,260,336 | 4/1981 | Johnson ............................. 416/96 R |

FOREIGN PATENT DOCUMENTS 520045 4/1940 United Kingdom .
586838 4/1947 United Kingdom .

OTHER PUBLICATIONS

Prior art cited as Figures A and B in the applicants disclosure statement filed 7-13-81.

Primary Examiner—Harvey C. Hornsby
Assistant Examiner—Michael Knick
Attorney, Agent, or Firm—Gene D. Fleischhauer

[57] ABSTRACT

A coolable rotor stage assembly 14 of the turbine 10 of an axial flow gas turbine engine is disclosed. A cavity 18 for purge air is adjacent the rotor disk 22. A nozzle 34 for metering the flow of cooling air through the rotor blade, for forming a jet of high velocity air and for directing the cooling air from the root of the rotor blade inhibits recirculation, retards formation of the radial pumping boundary layer, decreases the thickness t of the radial pumping boundary layer and does work on the rotor blade.

7 Claims, 6 Drawing Figures

NOZZLE FOR A COOLABLE ROTOR BLADE

DESCRIPTION

TECHNICAL FIELD

This invention relates to gas turbine engines and more particularly to coolable rotor stage assemblies for such engines which include a coolable rotor disk and an array of coolable rotor blades.

The concepts were developed in the axial flow gas turbine engine industry for metering the flow of cooling air through the turbine blades and for directing the flow of cooling air from the turbine blades of such engines but have wider applicability to similarly configured assemblies.

BACKGROUND ART

In the gas turbine engine field, rotor stage assemblies are typically formed of a rotor disk and a plurality of rotor blades extending outwardly from the disk. The rotor stage assemblies are interdigitated between adjacent stator assemblies. An annular flow path for hot working medium gases extends through the rotor stage assemblies and the stator assemblies. Each stator assembly has airfoils which cooperate with the airfoils of the adjacent rotor blades to enable the rotor blades to efficiently remove energy from the hot working medium gases flowing through the assemblies. As a result of the intimate contact between the airfoils of the rotor blades and the hot working medium gases, heat is transferred from the hot gases to the rotor blades.

In modern aircraft engines, cooling air may be flowed through each blade to remove a portion of this heat from the blade, reducing the temperature level and spanwise gradients in the blades and thereby improving the service life of the blade. An example of such a coolable rotor blade is shown in U.S. Pat. No. 3,635,586 to Kent et al entitled "Method and Apparatus for Turbine Blade Cooling".

Heat transfer from the hot working medium gases to the rotor disk is also of concern. The hot working medium gases may locally heat the rim region of the disk causing thermal gradients and stresses which decrease the service life of the disk. One approach to solving this problem is to cool the face of the disk with jets of cooling air. An example of such a construction is shown in U.S. Pat. No. 2,858,101 to Alford. In Alford, cooling air is discharged in jets through a metering nozzle onto the face of the disk. The metering nozzles are oriented in a direction opposite to the direction of rotation of the disk.

Another approach is to flow purge air through a cavity between a rotor and stator structure, inwardly of the working medium flow path, to prevent the ingestion of hot gases from the working medium flow path. Work must be expended by the rotating machinery of the engine, such as a compressor, to pressurize the purge air. Accordingly, a loss of the purge air into the flow path decreases the efficiency of the engine.

The loss of purge air is increased by a large boundary layer between the purge air and the rotating rotor disk as compared with construction having a small boundary layer. The rotor disk acts as a centrifuge and through rotational forces pumps radially outwardly the air in the boundary layer. The flow outwardly of purge air may be balanced by the flow into the cavity of additional purge air, further decreasing the efficiency of the engine. Alternatively the purge air pumped from the boundary layer may be replaced by hot working medium gases from the flow path which are mixed with the purge air and recirculated to the gas path. Recirculating flow from the gas path into the boundary layer and back to the gas path causes deleterious heating of the rotor disk and also decreases the efficiency of the engine.

Accordingly, scientists and engineers continue to seek improved cooling systems for rotor assemblies which have minimal adverse effect upon the efficiency of the operating engines and yet provide satisfactory cooling of the rotor components.

DISCLOSURE OF INVENTION

According to the present invention, a discharge nozzle for metering the flow of cooling air through a rotor blade attached to a disk directs the cooling air from the root of the rotor blade in an inward direction and through the adjacent boundary layer causing the air discharged from the root of the rotor blade to interfere with the formation of a boundary layer on the disk.

In accordance with one embodiment of the present invention, a discharge nozzle for metering the flow of cooling air through a coolable rotor blade directs a jet of cooling air into an adjacent cavity inwardly of the working medium flow path such that the cooling air has a component of velocity directed opposite to the direction of rotation, a component of velocity directed in the axial direction through the boundary layer adjacent the disk and a component of velocity directed radially inwardly of the nozzle to interfere with the formation of a boundary layer along the disk to suppress the occurrence of recirculating flow, and to inhibit the loss of purge air through swirling flow.

A primary feature of the present invention is a coolable rotor blade having a root. The root is adapted by a passageway to discharge the cooling air flowed through the coolable rotor blade. A discharge nozzle is attached to the root for metering the flow of cooling air through the coolable rotor blade and for directing a jet of cooling air from the blade. Another feature is a circumferentially extending cavity inwardly of the working medium flow path and adjacent to the root region of the rotor blade. A source of air for purging the cavity is adjacent to the rotor and stator structure.

The principal advantage of the present invention is the gain in engine efficiency which results from reducing the amount of swirling air in the cavity and concomitantly the loss of the air into the working medium flow path by directing the cooling air in a direction opposite to the direction of rotation. Another advantage is the gain in engine efficiency that results from suppressing radial pumping and inhibiting the formation of a large boundary layer adjacent the rotor disk by directing the cooling air jet in an axial direction through the boundary layer and by directing the air jet radially inwardly through the boundary layer. Another advantage is the engine efficiency which results from precisely metering the flow of cooling air through the rotor blade with the discharge nozzle.

The foregoing, and other objects, features and advantages of the present invention will become more apparent in the light of the following detailed description of the preferred embodiment thereof as shown in the accompanying drawing.

BEST MODE FOR CARRYING OUT THE INVENTION

Figure 1:
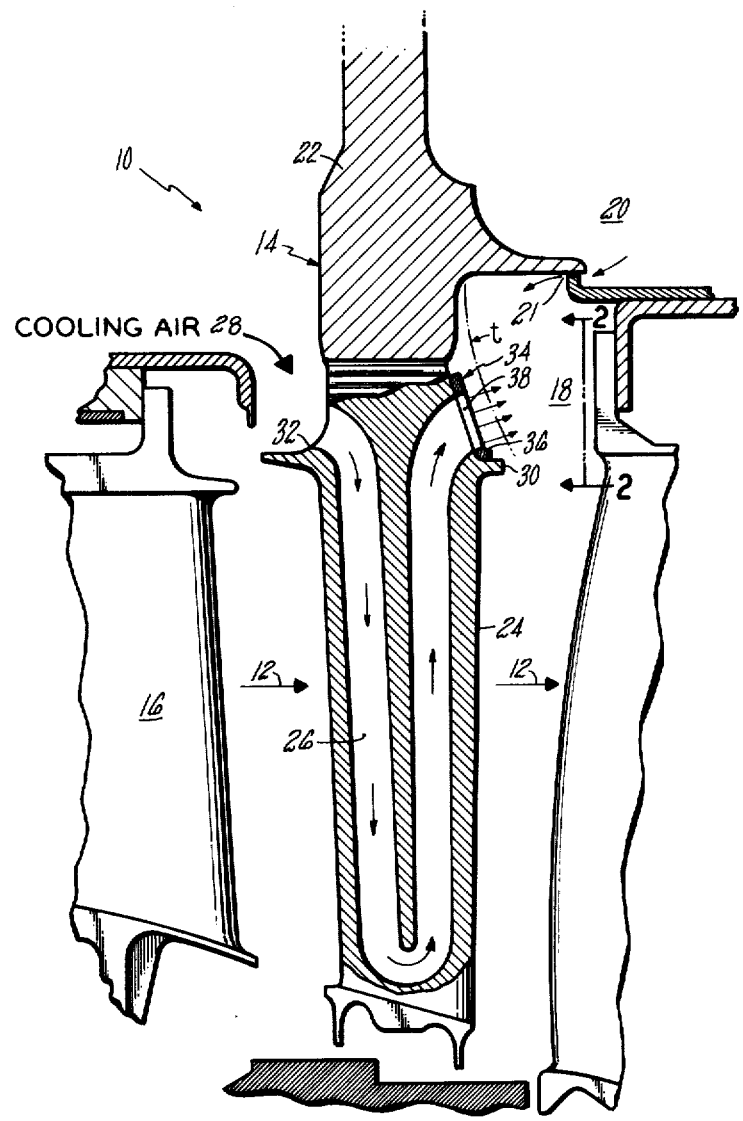
FIG. 1 is a cross sectional view of a portion of the turbine section of an axial flow gas turbine engine.

The concepts of the present invention are illustrated in the turbine section of a gas turbine engine. FIG. 1 shows a portion of the turbine 10. An annular flow path 12 for working medium gases extends axially through the turbine. The turbine includes a rotor stage assembly 14 and a stator assembly 16. Parts of these assemblies bound the inner portion of the annular working medium flow path. The rotor assembly is spaced axially from the stator assembly to form a cavity 18 therebetween. This cavity extends circumferentially and is inwardly of the working medium flow path. A source 20 of purge air is inwardly of the cavity. A gap 21 between the stator assembly and the rotor assembly places the source of purge air in gas communication with the cavity.

The rotor stage assembly 14 is formed of a rotor disk 22 and a plurality of rotor blades extending outwardly from the rotor disk across the working medium flow path 12 as represented by the single rotor blade 24. Each rotor blade is air coolable and has an internal passage 26 for cooling air. A source 28 for cooling air is in gas communication with an upstream compressor stage (not shown) and is in gas communication with the internal passage of the blade. The blade has a platform 30 bounding the working medium flow path. A root 32 extends inwardly from the platform and is inwardly of the working medium flow path. The root is adjacent to the purge air cavity 18 and is in a region where a boundary layer of some thickness t is formed by the purge air on the rotor disk. The root has a nozzle 34 for metering the flow of cooling air through the rotor blade for forming a jet of high velocity air and for directing the cooling air which is discharged from the root of the rotor blade. A jet of air having sufficient axial momentum to penetrate through the boundary layer is deemed to be of high velocity. As will be realized, the nozzle is fixed to the rotor blade and may be of integral construction with the rotor blade or may be a portion of a separate piece attached to the rotor blade, such as the orifice plate 36 attached to the root of the rotor blade. Preferably, the nozzle does not extend through the boundary layer.

Figure 2:
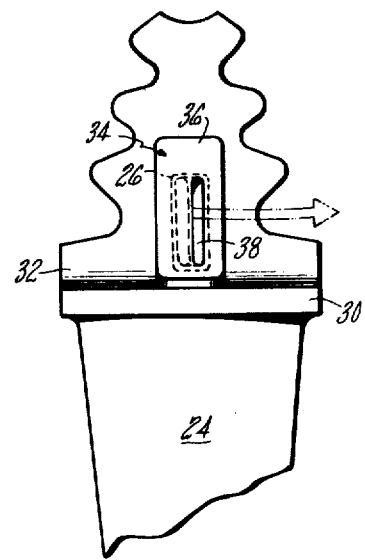
FIG. 2 is a view taken along the lines 2—2 of FIG. 1.

FIG. 2 is a view taken along the lines 2—2 of FIG. 1 and shows the orifice plate 36, a portion of the root 32 and a portion of the platform 30 of the blade. The broken line shows the generally circumferential direction of the flow directed from the orifice plate 36. As will be realized, the orifice plate may have a single hole or a plurality of holes for directing the flow.

Figure 3:
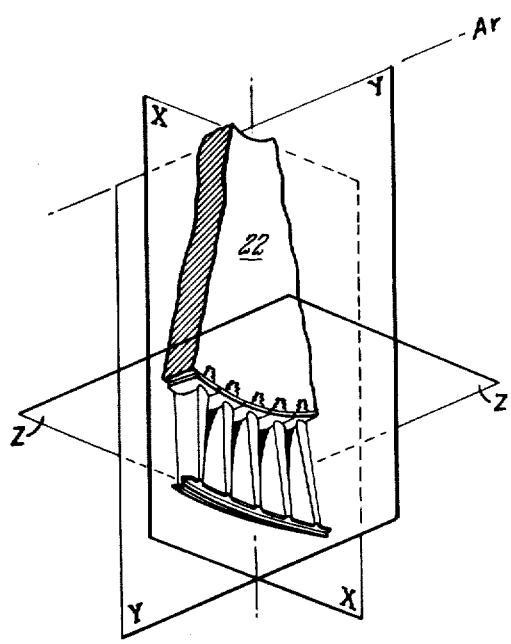
FIG. 3 is a partial perspective view of a rotor stage assembly showing a reference X-plane, a reference Y-plane and a reference Z-plane.

FIG. 3 is a partial perspective view of the rotor stage assembly showing a portion of the rotor assembly 14 of the engine. The rotor disk 22 has an axis of rotation $A_r$. Dimensions of the rotor blades are measured from a reference X-plane, a reference Y-plane and a reference Z-plane. In the installed condition, these reference planes have a particular orientation with respect to the axis of rotation $A_r$ of the rotor assembly. The reference Y-plane extends in the axial direction and contains the axis of rotation $A_r$. The reference X-plane is a radial plane perpendicular to the axis of rotation $A_r$ and is perpendicular to the Y-plane. The reference Z-plane is perpendicular to both the X and Y-planes. The Z-plane is a tangent plane at an abitrary radius from the axis of rotation $A_r$. The X, Y and Z-planes remain with the blade in its uninstalled condition.

Figure 4:
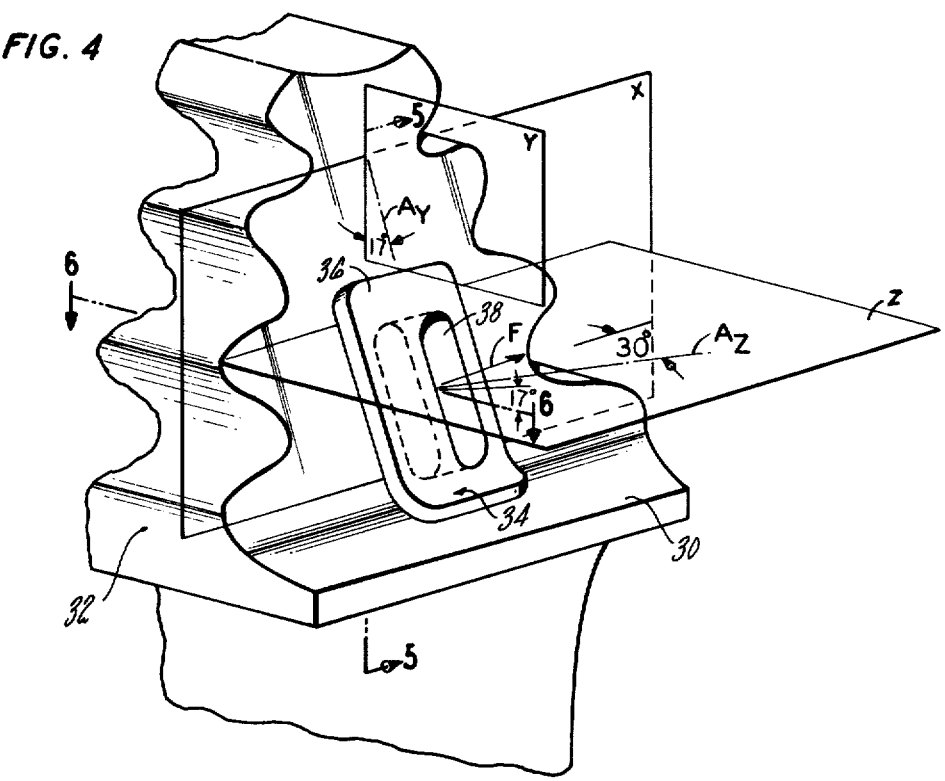
FIG. 4 is a partial perspective view of a portion of the root of the rotor blade.

FIG. 4 is a partial perspective view of the orifice plate 36 and the root 32 of the rotor blade to which the blade is attached. The flow of cooling air exiting the orifice plate has a direction F. The direction F has an angular orientation with respect to the Y-plane and with respect to the Z-plane. As will be realized, a direction of flow will exist for any asymmetrical or symmetrical hole. For purposes of illustration, a symmetrical hole is shown. A section parallel to the Y-reference plane (hereinafter referred to as a Y-plane section) is shown by the section 5—5. For any Y-plane section through the hole 38, the hole has a longitudinal axis of symmetry $A_y$. The angle between the axis of symmetry $A_y$ and the reference X-plane is an acute angle lying in the range of sixteen to eighteen degrees (16°-18°) which orients the hole such that it faces inwardly toward the axis of rotation of the engine. As a result, the direction F of the flow of cooling air has a projection in the Y-plane section such that the angle between the projection of F and the reference Z-plane also lies in the range of sixteen to eighteen degrees (16°-18°). This angular orientation of the flow causes the flow to be directed inwardly toward the axis of rotation of the engine. In addition to the radially inward component, the projection shows that the angular orientation of the direction of flow F has a component extending rearwardly in the axial direction. This axial component is a result of the orientation of the flow with respect to the reference Y and reference Z-planes.

Similarly, for any section taken along a plane parallel to the reference Z-plane (Z-plane section) through the hole 38, the hole has a transverse axis of symmetry $A_z$. The angle between the axis of symmetry $A_z$ and the reference X-plane is an acute angle lying in the range of twenty-eight to thirty-two degrees (28°-32°) which orients the hole such that it faces in a direction opposite to the direction of the rotation of the rotor disk. As a result, the direction F of the flow of cooling air has a projection in the Z-plane section such that the angle between the projection of F and the reference X-plane lies in the range of twenty-eight to thirty-two degrees (28°-32°). This angular orientation of the flow causes the flow to be directed tangentially in a direction opposite to the direction of rotation of the rotor disk. In addition to the tangential component, the projection shows that the angular orientation of the direction of flow F has an additional component extending rearwardly in the axial direction. This axial component is a result of the orientation of the flow with respect to the reference Z and the reference X-planes.

Figure 5:
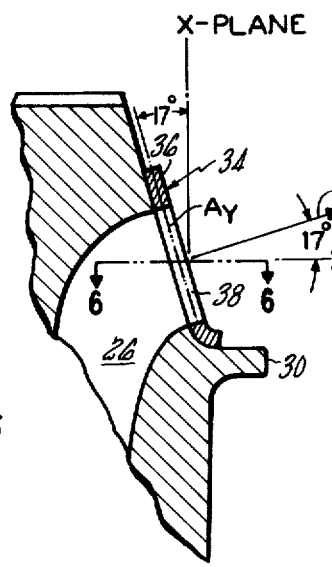
FIG. 5 is a sectional view taken along the lines 5—5 of FIG. 4 which coincide with a section taken parallel to the reference Y-plane.

FIG. 5 is a sectional view taken along the lines 5—5 of FIG. 4 and coincides with the Y-plane shown in FIG. 4. As can be seen in FIG. 5 the angle between the axis of symmetry $A_y$ and the X-reference plane is approximately seventeen degrees. Similarly, the angle between the projection of the direction of flow F and the reference Z-plane is approximately 17°.

Figure 6:
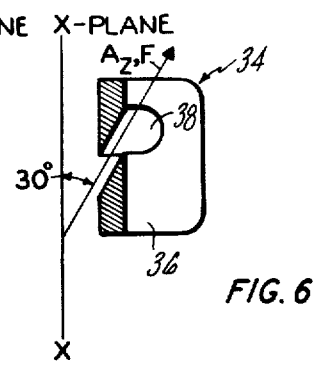
FIG. 6 is a sectional view taken along the lines 6—6 of FIG. 4 and FIG. 5 and coincides with a section parallel to the reference Z-plane shown in FIG. 4.

FIG. 6 is an enlarged sectional view taken along the lines 6—6 of FIG. 4 and FIG. 5 and coincides with a section taken along the Z-plane shown in FIG. 4. The angle between the axis of symmetry $A_z$ of the hole and the reference X-plane is approximately thirty degrees. Similarly, the angle between the projection of the direction of flow F and the reference X-plane is approximately 30°.

During operation of the gas turbine engine, working medium gases are flowed along the annular flow path 12. The working medium gases impart energy to the rotor assembly 14 causing the rotor assembly to rotate in a counterclockwise direction about the axis of rotation $A_r$. Heat is transferred from the hot working medium gases to the rotor blades 24 which are in intimate contact with the gases. Cooling air flowed from a source of cooling air 28 through the rotor blade provides cooling to the blade. Although the cooling air is heated by heat transfer from the blade to the cooling air, the cooling air temperature is still much less than the working medium gases in the annular flow path. The cooling air is discharged through the nozzle 34. The pressure difference between the cooling air upstream of the nozzle and the cavity 18 causes the cooling air to exit as a high velocity jet with enough velocity to pass through the boundary layer formed by the purge air being pumped radially outwardly along the disk. As will be realized, this pumping action results from the rotation of the disk which imparts rotational energy to the purge air flowed into the cavity 18.

The cooling air has components of velocity which determine the direction of flow F. The cooling air has a component of velocity directed radially inwardly such that the air discharged from the root of the rotor blade interferes not only with the formation of the purge air boundary layer but also retards the outward movement of the purge air boundary layer by reason of the inward momentum of the cooling air.

The cooling air has a component of velocity directed opposite to the direction of rotation. This component of velocity results in a reduction in the cooling air velocity in the circumferential direction from the speed of the rotor disk to nearly a zero velocity. The thrust produced by this component of coolant injection adds to the energy of the rotor assembly. In addition, because the air is at zero velocity, there is no tendency for the air to swirl outwardly into the working medium flow path.

The cooling air jet also has a component of velocity extending in the axial direction as a result of the first acute angle and the second acute angle of the cooling air hole. This component of velocity insures that the cooling air jet breaks through the boundary layer and is not captured by the boundary layer such that a thickening of the rotating boundary layer is avoided. As will be realized, an increase in the thickness of the rotating boundary layer increases the amount of purge air that the boundary layer will pump from the cavity into the working medium flow path. Avoiding this pumping avoids the need to take increased amounts of purge air from the basic gas generator cycle or avoids the recirculation of additional hot working medium gases from the gas generator system.

Although the invention has been shown and described with respect to preferred embodiments thereof, it should be understood by those skilled in the art that various changes and omissions in the form and detail thereof may be made therein without departing from the spirit and the scope of the invention.

We claim:

1. In an axial flow gas turbine engine of the type having an axis of rotation and an annular flow path for working medium gases bounded on the inward side by a stator assembly and a rotor stage assembly wherein the rotor assembly is spaced axially from the stator assembly to form a circumferentially extending cavity therebetween which is supplied with purge air and wherein the rotor assembly is formed of a rotor disk having a rim region and a plurality of coolable rotor blades extending outwardly from the rim region of the rotor disk across the working medium flow path each blade having a root inwardly of the working medium flow path and adjacent to the purge air cavity in the region where a boundary layer is formed by the purge air on the rotor disk, the improvement which comprises:

nozzle means fixed to the rotor blade and adjacent the boundary layer for metering the flow of cooling air through the rotor blade and directing cooling air which is discharged from the root of the rotor blade axially through the boundary layer into the cavity and radially inwardly toward the axis of the engine such that the air discharged from the root of the rotor blade interferes with the formation of the purge air boundary layer.

2. The means for metering and directing the flow of cooling air through the rotor blade of claim 1 wherein the cooling air has a component of velocity directed opposite to the direction of rotation of the rotor stage assembly to inhibit the formation of swirling flow in the cavity and to do work on the rotor stage assembly.

3. The invention as claimed in claim 1 wherein the means for metering and directing the flow of cooling air is oriented with respect to a reference Y-plane extending in an axial direction and containing the axis of the engine, a reference X-plane perpendicular to the Y-plane and perpendicular to the axis of the engine, and a reference Z-plane perpendicular to the X-plane and the Y-plane such that the flow of cooling air exiting from the rotor blade which has a direction F has a projection of F in the reference Y-plane which forms an angle with the reference Z-plane of approximately seventeen degrees and has a projection of F in the reference Z-plane which forms an angle with the reference X-plane of approximately thirty degrees.

4. The invention as claimed in claim 2 wherein the means for metering and directing the flow of cooling air is an orifice plate having at least one hole therethrough which is attached to the root of the rotor blade.

5. The invention as claimed in claim 4 wherein the orifice plate is disposed about a reference line at the intersection of a reference Y-plane extending in an axial direction and containing the axis of the engine, a reference X-plane perpendicular to the Y-plane and perpendicular to the axis of the engine, and a reference Z-plane perpendicular to the X-plane and the Y-plane, wherein the orifice plate has a hole having an axis of symmetry lying in the Y-plane, said axis of symmetry forming a first acute angle with respect to the X-plane and has a second axis of symmetry lying in the Z-plane such that the axis of symmetry forms a second acute angle with respect to the X-plane.

6. The invention as claimed in claim 4 wherein the first acute angle lies in a range of sixteen to nineteen degrees (16° to 19°) and the second acute angle lies in a range of twenty-eight to thirty-two degrees (28° to 32°).

7. The invention as claimed in claim 4 wherein the boundary layer has a thickness and the orifice plate is brazed to the root of the airfoil and extends from the disk a distance less than the thickness of the boundary layer.

* * * * *